US009299387B2

(12) United States Patent
Takada et al.

(10) Patent No.: US 9,299,387 B2
(45) Date of Patent: Mar. 29, 2016

(54) MAGNETIC DISK APPARATUS, CONTROLLER AND DATA PROCESSING METHOD

(71) Applicant: Kabushiki Kaisha Toshiba, Minato-ku, Tokyo (JP)

(72) Inventors: Kazuya Takada, Kamakura Kanagawa (JP); Kenji Yoshida, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/482,117

(22) Filed: Sep. 10, 2014

(65) Prior Publication Data

US 2016/0027469 A1 Jan. 28, 2016

Related U.S. Application Data

(60) Provisional application No. 62/029,262, filed on Jul. 25, 2014.

(51) Int. Cl.

| | |
|---|---|
| ***G11B 5/09*** | (2006.01) |
| ***G11B 5/596*** | (2006.01) |
| ***G11B 20/18*** | (2006.01) |
| ***G11B 27/36*** | (2006.01) |
| *G11B 20/14* | (2006.01) |

(52) U.S. Cl.
CPC ............ *G11B 20/1879* (2013.01); *G11B 27/36* (2013.01); *G11B 2020/148* (2013.01)

(58) Field of Classification Search
CPC .... G11B 5/59655; G11B 27/36; G11B 5/012; G11B 2220/20; G11B 2220/90; G11B 27/3027; G11B 20/10009; G11B 5/5534; G11B 5/59627; G11B 2020/148; G11B 20/1879
USPC ............ 360/31, 25, 29, 39, 48, 53, 77.04, 45, 360/41, 50, 55
See application file for complete search history.

(56) References Cited

U.S. PATENT DOCUMENTS

| | | | | |
|---|---|---|---|---|
| 5,608,891 | A | 3/1997 | Mizuno et al. | |
| 7,117,387 | B2 | 10/2006 | Katsuragi et al. | |
| 7,933,087 | B1 * | 4/2011 | Tsai et al. | 360/48 |
| 8,583,986 | B2 * | 11/2013 | Keeler et al. | 714/763 |
| 2007/0189137 | A1 * | 8/2007 | Saito et al. | 369/47.32 |
| 2010/0079904 | A1 | 4/2010 | Sato | |

* cited by examiner

*Primary Examiner* — Nabil Hindi
(74) *Attorney, Agent, or Firm* — White & Case LLP

(57) ABSTRACT

According to one embodiment, a magnetic disk apparatus includes an RW channel with an internal memory for processing data to be read/written from/to a magnetic disk, a transfer controller for controlling data transfer between a host apparatus and the RW channel, and a processor for controlling the RW channel and transfer controller. The processor reads, from the magnetic disk, predetermined area data including to-be-rewritten data, subjects the read predetermined area data to error correction processing in the RW channel, and stores resultant data in the internal memory. The processor rewrites, with rewrite data from the host apparatus, the to-be-rewritten data of the predetermined area data stored in the internal memory to update the predetermined area data, adds an error correction code to the updated data in the RW channel module, and writes resultant data to the magnetic disk.

18 Claims, 4 Drawing Sheets

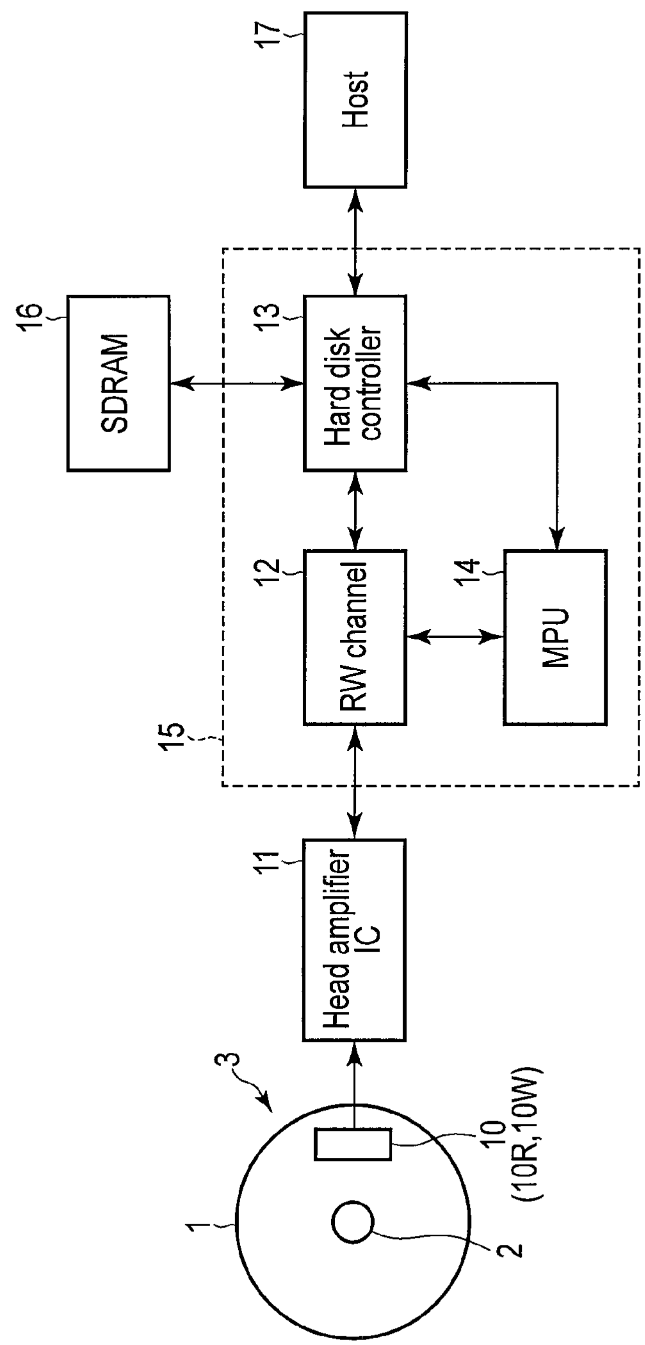
F I G. 1

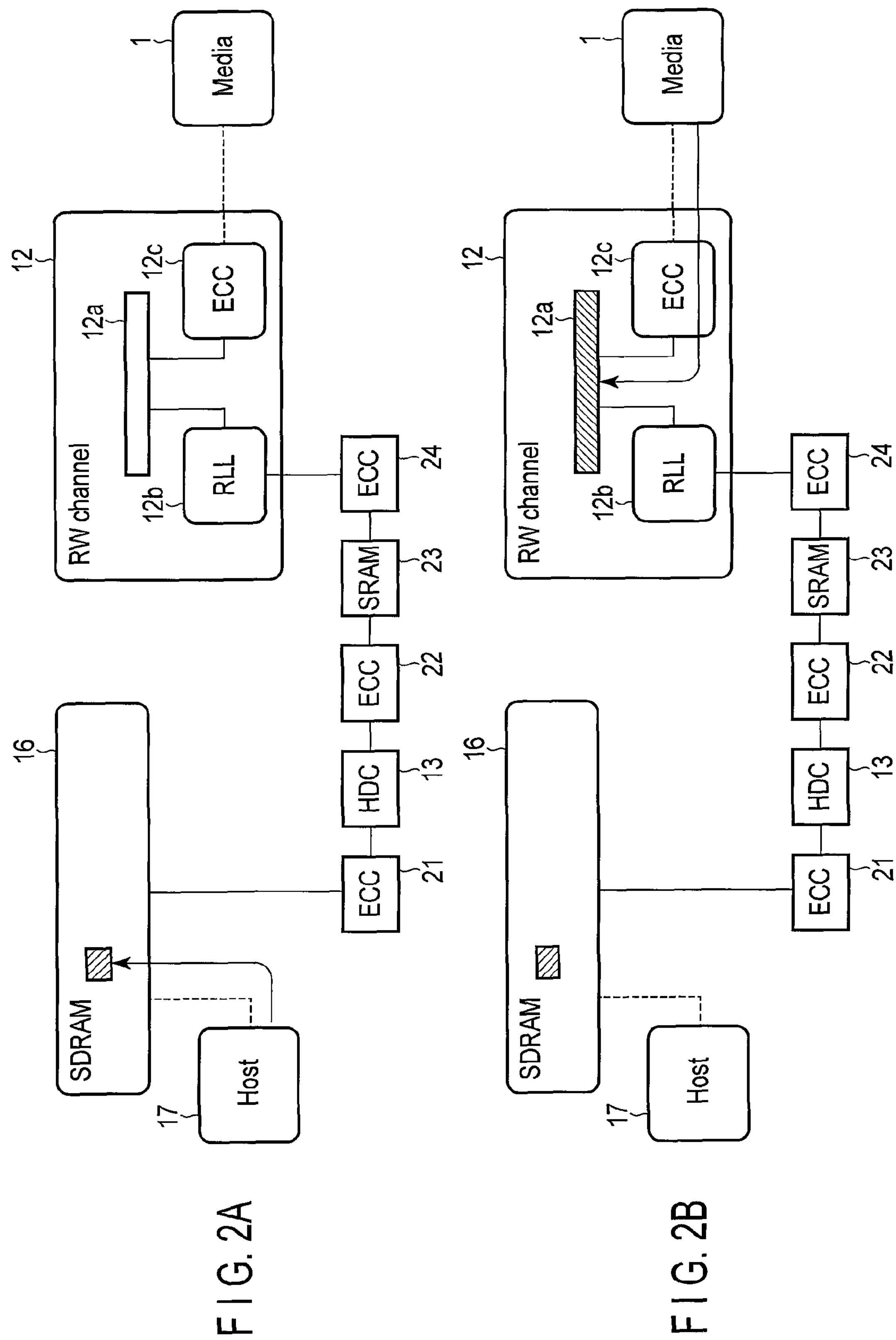
Media
1
RW channel
12
12a
12b
12c
ECC
RLL
ECC
24
SRAM
23
ECC
22
HDC
13
ECC
21
SDRAM
16
Host
17
F I G. 2A
Media
1
RW channel
12
12a
12b
12c
ECC
RLL
ECC
24
SRAM
23
ECC
22
HDC
13
ECC
21
SDRAM
16
Host
17
F I G. 2B

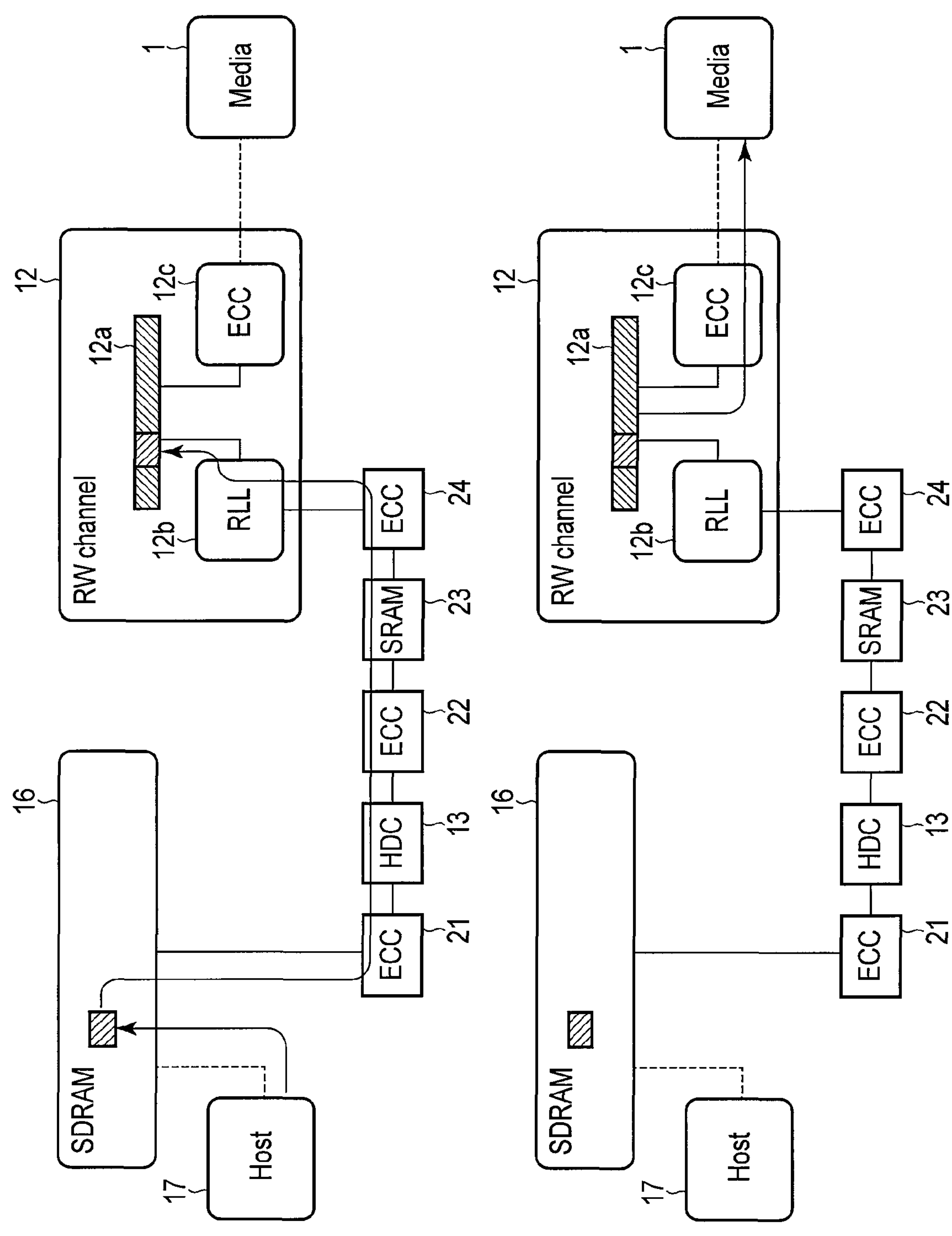
F I G. 2C
F I G. 2D

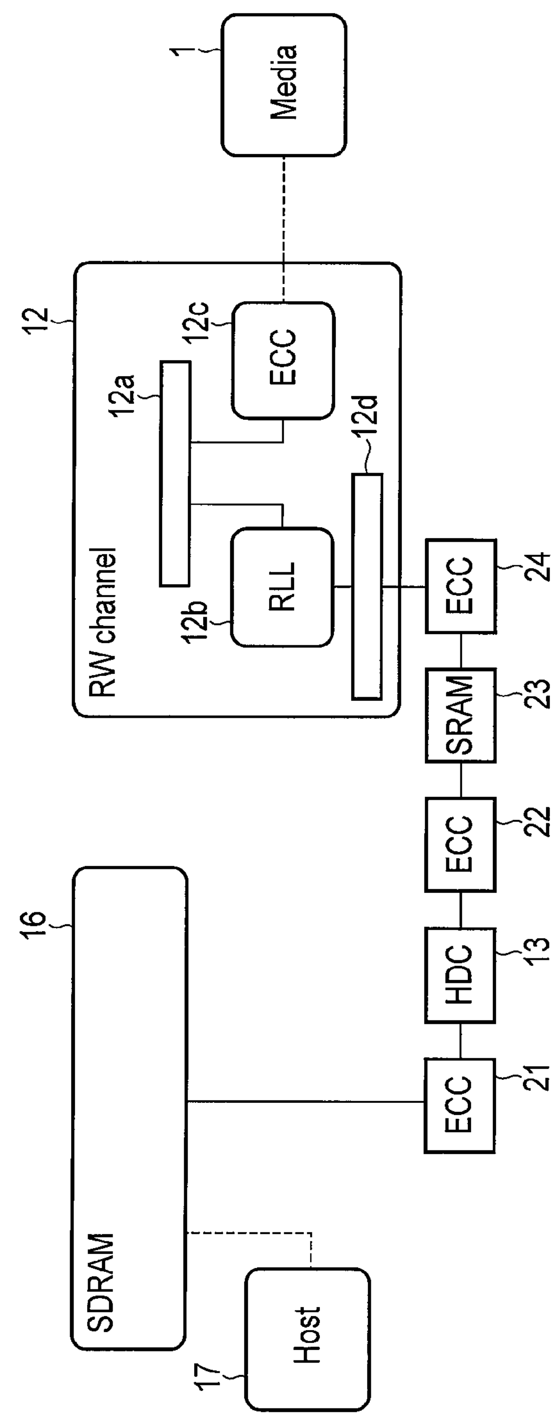
F I G. 3

MAGNETIC DISK APPARATUS, CONTROLLER AND DATA PROCESSING METHOD

CROSS-REFERENCE TO RELATED APPLICATIONS

This application claims the benefit of U.S. Provisional Application No. 62/029,262, filed Jul. 25, 2014, the entire contents of which are incorporated herein by reference.

FIELD

Embodiments described herein relate generally to a magnetic disk apparatus, a controller for use in the magnetic disk apparatus, and a data processing method for the controller.

BACKGROUND

In current hard disk drives (HDDs), the data size based on the magnetic disk format is often greater than the size of data transferred from a host (computer). The data size based on the magnetic disk format refers to a unit of writing or reading to or from the magnetic disk (hereinafter also referred to as a medium). If, for example, error correction code (ECC) processing is performed, the unit of ECC processing is also considered a reference for the data size. The data size unit based on the magnetic disk format may further vary depending upon the efficiency of use of the medium, the density of recording, etc. As the data size unit is increased, the efficiency of use of the medium basically increases. However, in accordance with the increase in data size unit, more time is required to process a small amount of data. Also considering such a tradeoff, the data size unit may be determined.

In the above-mentioned HDDs, when the size of data to be written (rewritten) by the host is smaller than the data size unit based on the magnetic disk format, data corresponding to one data size unit and including the data to be rewritten is once read from the medium and stored in a data buffer, such as a synchronous dynamic random access memory (SDRAM). At this time, in general, the data of one data size unit is stored in the data buffer after being subjected to processing, such as ECC or parity check, for data protection. Then, part of the data of one data size unit is rewritten in the data buffer with rewrite data sent from the host. The data of one data size unit, which has been partially rewritten, is again subjected to processing, such as ECC or parity check, and is then written to the medium (magnetic disk).

BRIEF DESCRIPTION OF THE DRAWINGS

FIG. 1 is a block diagram showing a main part of a magnetic disk apparatus according to an embodiment;

FIGS. 2A, 2B, 2C and 2D show structures extracted from the embodiment and show the operation of the embodiment; and FIG. 3 shows a modification of an RW channel according to the embodiment.

DETAILED DESCRIPTION

Various embodiments will be described hereinafter with reference to the accompanying drawings.

In general, according to one embodiment, a magnetic disk apparatus comprises: a magnetic disk; a read/write (RW) channel module having an internal memory and configured to process data to be read and written from and to the magnetic disk; a transfer controller configured to control data transfer between a host apparatus and the RW channel module; and a processor configured to control the RW channel module and the transfer controller. The processor is further configured to read predetermined area data including to-be-rewritten data from the magnetic disk, subject the read predetermined area data to error correction processing in the RW channel module, and store resultant data in the internal memory; to transfer rewrite data from the host apparatus to the RW channel module via the transfer controller, and rewrite, with the rewrite data, the to-be-rewritten data of the predetermined area data stored in the internal memory to thereby update the predetermined area data; and to add an error correction code to the updated predetermined area data in the RW channel module, and write resultant data to the magnetic disk.

FIG. 1 is a block diagram showing a main part of an HDD, i.e., a magnetic disk apparatus, according to an embodiment.

As shown in FIG. 1, the HDD comprises a head-disk assembly (HDA) 3, a head amplifier integrated circuit (hereinafter referred to as a head amplifier IC) 11, a system on a chip (SoC) 15 and an SDRAM 16 which is a buffer memory. The HDA 3 comprises a magnetic disk 1 as a recording medium, a spindle motor 2 and a head 10. The magnetic disk 1 is spun by the spindle motor 2.

The head 10 is controlled to moved to a target position on the magnetic disk 1 by an actuator (not shown) including a voice coil motor (VCM). The head 10 comprises a write head 10W and a read head 10R mounted on a slider as the main body of the head 10. The read head 10R reads servo data (position data) from servo areas on the magnetic disk 1, and reads user data from data areas. The write head 10W writes user data to the data areas on the magnetic disk 1.

The head amplifier IC 11 comprises a read amplifier and a write driver. The read amplifier amplifies a read signal read by the read head 10R, and transfers the amplified signal to a read/write (RW) channel 12. The write driver supplies, to the write head 10W, a write current corresponding to write data output from the RW channel 12.

The SoC 15 is formed of an integrated circuit of one chip comprising the RW channel 12, a hard disk controller (HDC) 13 and a microprocessor (MPU) 14. The RW channel 12 processes the read signal read by the read head 10R via the head amplifier IC 11 to decode servo or user data. Further, the RW channel 12 encodes write data sent form the HDC 13.

The HDC 13 comprises an interface controller for controlling data transfer to and from a host 17, the SDRAM 16 and the RW channel 12, and a user logic circuit. The interface controller controls the SDRAM 16 to temporarily store therein read and write data, thereby performing data transfer control. The user logic circuit is a circuit that performs various calculations using hardware, more specifically, performs high speed calculations of lower level than the MPU 14.

The MPU 14 is a main controller for the HDD, and comprises a servo control system configured to perform servo control processing. The servo control system controls a head positioning mechanism for positioning the head to a target position. The head positioning mechanism comprises an actuator (including a VCM) for driving the head 10, and a VCM driver. The MPU 14 also controls data reading and writing via the RW channel 12 and the HDC 13.

A description will now be given of rewrite processing according to the embodiment for rewriting part of the data recorded on the magnetic disk 1, with rewrite data sent from the host 17.

FIGS. 2A to 2D are figures showing the structure of the embodiment and used for explaining the operation of the embodiment. In these figures, elements similar to those shown in FIG. 1 are denoted by corresponding reference numbers, and no detailed description will be given thereof.

An internal memory 12*a* incorporated in the RW channel 12 is a memory configured to store data of one unit or more based on a disk format, and is e.g. an SRAM. A first ECC processing module 12*c* is configured to add an error code for ECC processing to data transferred from the internal memory 12*a*, and to provide the resultant data to the magnetic disk 1. The first ECC processing module 12*c* is also configured to perform error correction on the data read from the magnetic disk 1, and to provide the resultant data to the internal memory 12*a*. Namely, the first ECC processing module 12*c* is an error correction processing module provided for data protection in association with the magnetic disk 1. An RLL processing module 12*b* is configured to decode data provided by the internal memory 12*a* by Run Length Limited (RLL) decoding, and to provide the resultant data to a fourth ECC processing module 24. The RLL processing module 12*b* is also configured to perform RLL coding on the data provided by the fourth ECC processing module 24, and to provide the resultant data to the internal memory 12*a*.

An SRAM 23 is a buffer memory for synchronizing the processing of the SDRAM 16 and that of the RW channel 12. Third and fourth ECC processing modules 22 and 24 are error correction processing modules provided for the SRAM 23 for data protection. The second ECC processing module 21 is an error correction processing module provided for the SDRAM 16 for data protection.

The operation of the embodiment will be described in detail. The following operation is realized when the MPU 14 comprehensively controlling the HDD controls the RW channel 12, the HDC 13, etc.

In the embodiment, a description will be given for a case where the host apparatus 17 performs processing in units of 512 bytes, and the magnetic disk 1 perform processing in units of 4096 bytes. Data size of 4096 bytes is one data size unit based on the disk format. Further, in the embodiment, an example will be described where in the RW channel 12, after the ECC correction by the first ECC processing module 12*c*, the data before RLL decoding is held in the RW channel, and part of the held data is rewritten.

Firstly, as shown in FIG. 2A, write data (rewrite data) of 512 bytes is transferred from the host apparatus 17. The write data has an error code added for ECC processing in order to protect data in the SDRAM. The capacity of 512 bytes is dedicated to user data. Actually, the write data is transferred from the host apparatus 17 to the SDRAM 16 via the HDC 13 and stored in the SDRAM under the control of the MPU 14, as is shown in FIG. 1. Thus, the signal lines indicated by the broken lines in FIG. 2A indicate, for facilitating the description, that the HDC 13 interposed therebetween is omitted.

Subsequently, as shown in FIG. 2B, data of 4096 bytes is transferred from the magnetic disk 1 to the RW channel 12, where it is error-corrected by the first ECC processing module 12*c* and is then stored in the internal memory 12*a*. The recording area on the magnetic disk 1 for the 4096-byte data (predetermined area data) includes a recording area for 512-byte data to be rewritten by the rewrite data of 512 bytes shown in FIG. 2A. The 4096-byte data stored in the internal memory 12*a* is user data from which an error code for ECC processing is removed and which is RLL-encoded. As the internal memory 12*a*, e.g. an SRAM, which can be easily controlled and constructed, is used. The steps of processing described with reference to FIGS. 2A and 2B can be performed in parallel.

After that, as shown in FIG. 2C, the 512-byte rewrite data transferred from the host apparatus 17, and information indicative of the position (the leading address of rewritten data) in the data of 4096 bytes stored in the internal memory 12*a* and the length (512 bytes) are transferred to the RW channel under the control of the MPU 14.

At this time, the rewrite data of 512 bytes stored in the SDRAM 16 are transferred to and processed by the second ECC processing module 21, HDC 13, third ECC processing module 22, SRAM 23, and fourth ECC processing module 24. More specifically, the rewrite data (user data) of 512 bytes stored in the SDRAM 16 is processed as follows under the control of the MPU 14: (1) The user data error-corrected by the second ECC processing module 21 is transferred via the HDC 13 to the third ECC processing module 22, (2) where an error code for ECC processing is added. (3) The error-code added data is stored in the SRAM 23. (4) The stored data is error-corrected by the fourth ECC processing module 24. (5) The error-corrected data is RLL-encoded by the RLL processing module 12*b*. (6) The data in the area (to be rewritten area) in the 4096-byte data stored in the internal memory 12*a* is rewritten by the above-mentioned RLL-encoded data. Thus, by rewriting part (512 byte data) of the data by the rewrite data, the 4096-byte data stored in the internal memory 12*a* is updated.

Thereafter, as shown in FIG. 2D, the first ECC processing module 12*c* of the RW channel 12 adds an error code to the updated user data of 4096 bytes in the internal memory 12*a*, and writes the resultant data to the magnetic disk 1.

In a comparative example in which part of data on the magnetic disk is rewritten, in data of one unit based on the magnetic disk format, the portion of the data other than the portion to be actually rewritten is also transferred from the magnetic disk to a data buffer, and transferred from the data buffer to the magnetic disk. Accordingly, extra time is needed. Further, in the comparative example, the data portion other than the portion to be actually rewritten is also checked by, for example, the second to fourth ECC processing modules 21, 22, 24. Therefore, if an error occurs in the data portion other than the portion to be rewritten, error correction, for example, which is unnecessary in a normal situation, is done. In such a comparative example as the above, the memory in the RW channel cannot be operated from the outside of the RW channel, and only RLL and ECC processing can be performed on, for example, 4096-byte data. Namely, the comparative example does not employ a structure in which part of the area in the memory of the RW channel is specified and rewritten.

For instance, in the comparative example, when part (e.g., 512-byte data) of the data recorded on the magnetic disk 1 is rewritten by rewrite data of 512 bytes transferred from the host apparatus, firstly, write data of, for example, 4096 bytes including the to-be-rewritten area is read from the magnetic disk. Subsequently, the read data is subjected to ECC-error correction and RLL decoding in the RW channel. The 4096-byte data processed in the RW channel is transferred to the SDRAM 16 via the fourth ECC processing module 24, the SRAM 23, the third ECC processing module 22, HDC 13 and the second ECC processing module 21. In the SDRAM 16, part of the stored 4096-byte data is rewritten by rewrite data transferred from the host apparatus 17. Thus, in the comparative example, rewrite of the partial data is performed in the SDRAM 16. The 4096-byte data updated by rewriting of the partial data is recorded on the magnetic disk 1 through a path opposite to the above-mentioned one, i.e., through the second ECC processing module 21, the HDC 13, the third ECC processing module 22, the SRAM 23, the fourth ECC processing module 24 and the RW channel.

By virtue of the above-described processing of the embodiment, only a necessary data portion (e.g., 512-byte data) can be rewritten in the RW channel without transferring, e.g., the 4096-byte data on the magnetic disk to the SDRAM.

Although in the above-mentioned embodiment, the data obtained after ECC correction in the RW channel 12 is held within the RW channel 12, data obtained after RLL decoding may be held in the RW channel 12. FIG. 3 shows a structure example in this case. In this modification, 4096-byte data obtained after error correction by the first ECC processing module 12*c* and RLL decoding by the RLL processing module 12*b* is stored in an internal data rewrite memory 12*d*. Part (512-byte data) of the stored 4096-byte data is rewritten with the rewrite data (512-byte data) sent from the host apparatus. In this case, the internal memory 12*a* is used as a buffer for synchronizing RLL processing and ECC processing. The 4096-byte data containing the to-be-rewritten area may be held in any stage but after it is subjected to ECC correction and guaranteed as correct data. Namely, it is preferable that the internal memory of the RW channel for rewrite data is provided in a location in which data rewrite can be performed most efficiently.

Further, if a NAND flash memory functioning as a cache memory is connected to the HDC 13, a hybrid HDD can be realized. It is a matter of course that the embodiment is also applicable to the hybrid HDD.

As described above, in the embodiment, when part of data on the magnetic disk is rewritten, it is not necessary, unlike the comparative example, to transfer, to the SDRAM 16 as a data buffer, the whole one unit data (e.g., 4096-byte data) based on the disk format. This shortens the time required for the transfer, and hence shortens the time required for rewrite as a whole.

Further, since a data path for transferring one unit data (e.g., 4096-byte data) based on the disk format is shorter than the comparative example, the number of errors occurring in the data path will be reduced. In general, when part of the one unit data is rewritten, this rewrite is performed in the SDRAM 16, which means that the one unit data is transferred twice through the path of, for example, the second ECC processing module 21, the HDC 13, the third ECC processing module 22, the SRAM 23 and the fourth ECC processing module 24 which are provided between the SDRAM and the RW channel. In the embodiment, however, rewrite data (512-byte data) sent from the host apparatus passes through the path only one time as shown in FIG. 2C, and hence the number of transfer errors that have occurred between the SDRAM and the RW channel is substantially 1/16 th the number of transfer errors in the comparative example.

Yet further, the amount of data transferred to the SDRAM 16 as a data buffer is relatively small in the embodiment, which enhances the efficiency of use of the SDRAM 16. The SDRAM 16 is frequently accessed by the host apparatus 17, the MPU 14, other processors, etc., when user data and various tables, etc., are written to and read from the magnetic disk apparatus, in addition to the time when data is rewritten as described above. In the comparative example, when part of the data recorded on the magnetic disk is rewritten, the one unit data (of e.g., 4096 bytes) and the rewrite data (of e.g. 512 bytes) from the host apparatus 17 are written to the SDRAM 16, and updated one unit data is read from the SDRAM. In contrast, in the embodiment for data rewrite, only writing of rewrite data from the host apparatus 17 and reading of the written data are performed with respect to the SDRAM 16. This reduces the time of use of the SDRAM 16 to about 1/16 by simple arithmetic, compared to the comparative example. As a result, the SDRAM 16 can be effectively used for other processing, which means that the efficiency of use of the SDRAM 16 is enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:

a magnetic disk;

a read/write (RW) channel module having an internal memory and configured to process data to be read and written from and to the magnetic disk;

a buffer memory configured to temporarily store read data and write data;

a transfer controller configured to control data transfer between a host apparatus and the RW channel module; and a processor configured to control the RW channel module and the transfer controller, wherein the transfer controller controls data transfer between the host apparatus, the RW channel module and the buffer memory;

the processor is further configured to:

read predetermined area data including to-be-rewritten data from the magnetic disk, subject the read predetermined area data to error correction processing in the RW channel module, and store resultant data in the internal memory;

store rewrite data from the host apparatus in the buffer memory via the transfer controller;

transfer the rewrite data stored in the buffer memory to the RW channel module, and rewrite, with the rewrite data, the to-be-rewritten data of the predetermined area data stored in the internal memory to thereby update the predetermined area data;

update, in the RW channel module, the predetermined area data stored in the internal memory using the rewrite data; and add an error correction code to the updated predetermined area data in the RW channel module, and write resultant data to the magnetic disk.

2. The magnetic disk apparatus of claim 1, wherein a first error correction processing module, a synchronization memory for synthesizing the buffer memory and the RW channel module, and a second error correction processing module are provided between the buffer memory and the RW channel module; and data from the buffer memory is stored in the synchronization memory after an error correction code is added by the first error correction processing module, and the stored data is subjected to error correction in the second error correction processing module.

3. The magnetic disk apparatus of claim 1, wherein the rewrite data stored in the buffer memory is added with a first error correction code;

a first error correction processing module, a second error correction processing module, a synchronization memory for synthesizing the buffer memory and the RW channel module, and a third error correction processing module are provided between the buffer memory and the RW channel module; and the rewrite data stored in the buffer memory is error-corrected in the first error correction processing module, using the first error correction code, a second error correction code is added to the error-corrected data in the second error correction processing module, the code-added data is stored in the synchronization memory, and the stored data is error-corrected using the second error correction code in the third error correction processing module.

4. The magnetic disk apparatus of claim 1, wherein the processor RLL-encodes, in the RW channel module, the predetermined area data that is subjected to error correction processing, and store resultant data in the internal memory.

5. The magnetic disk apparatus of claim 2, wherein the processor RLL-encodes, in the RW channel module, the predetermined area data that is subjected to error correction processing, and store resultant data in the internal memory.

6. The magnetic disk apparatus of claim 3, wherein the processor RLL-encodes, in the RW channel module, the predetermined area data that is subjected to error correction processing, and store resultant data in the internal memory.

7. A controller configured to control data to be read from and written to a magnetic disk, comprising:

a read/write (RW) channel module having an internal memory and configured to process data to be read from and written to the magnetic disk;

a transfer controller configured to control data transfer between a host apparatus and the RW channel module; and a processor configured to control the RW channel module and the transfer controller wherein the transfer controller controls data transfer to and from a buffer memory temporarily storing read data and write data, the host apparatus, and the RW channel module;

the processor is further configured to:

read predetermined area data including to-be-rewritten data from the magnetic disk, subject the read predetermined area data to error correction processing in the RW channel module, and store resultant data in the internal memory;

store rewrite data from the host apparatus in the buffer memory via the transfer controller;

transfer the rewrite data stored in the buffer memory to the RW channel module, and rewrite, with the rewrite data, the to-be-rewritten data of the predetermined area data stored in the internal memory to thereby update the predetermined area data;

update, in the RW channel module, the predetermined area data stored in the internal memory using the rewrite data; and add an error correction code to the updated predetermined area data in the RW channel module, and write resultant data to the magnetic disk.

8. The controller of claim 7, wherein the processor RLL-encodes, in the RW channel module, the predetermined area data that is subjected to error correction processing, and store resultant data in the internal memory.

9. A data processing method of a controller for controlling data to be read from and written to a magnetic disk, comprising:

processing data to be read from and written to the magnetic disk, using a read/write (RW) channel module having an internal memory; and controlling data transfer between a host apparatus, the RW channel module and the magnetic disk, wherein the controlling the data transfer includes:

controlling data transfer to and from a buffer memory temporarily storing read data and write data, the host apparatus, and the RW channel module;

reading predetermined area data including to-be-rewritten data from the magnetic disk, subjecting the read predetermined area data to error correction processing in the RW channel module, and storing resultant data in the internal memory;

storing rewrite data from the host apparatus in the buffer memory;

transferring the rewrite data stored in the buffer memory to the RW channel module, and rewriting, with the rewrite data, the to-be-rewritten data of the predetermined area data stored in the internal memory to thereby update the predetermined area data;

updating, in the RW channel module, the predetermined area data stored in the internal memory using the rewrite data; and adding an error correction code to the updated predetermined area data in the RW channel module, and writing resultant data to the magnetic disk.

10. The method of claim 9, wherein the storing the resultant data in the internal memory comprises RLL-encoding, in the RW channel module, the predetermined area data that is subjected to error correction processing, and storing resultant data in the internal memory.

11. The controller of claim 7, wherein a first error correction processing module, a synchronization memory for synthesizing the buffer memory and the RW channel module, and a second error correction processing module are provided between the buffer memory and the RW channel module; and data from the buffer memory is stored in the synchronization memory after an error correction code is added by the first error correction processing module, and the stored data is subjected to error correction in the second error correction processing module.

12. The controller of claim 7, wherein the rewrite data stored in the buffer memory is added with a first error correction code;

a first error correction processing module, a second error correction processing module, a synchronization memory for synthesizing the buffer memory and the RW channel module, and a third error correction processing module are provided between the buffer memory and the RW channel module; and the rewrite data stored in the buffer memory is error-corrected in the first error correction processing module, using the first error correction code, a second error correction code is added to the error-corrected data in the second error correction processing module, the code-added data is stored in the synchronization memory, and the stored data is error-corrected using the second error correction code in the third error correction processing module.

13. The controller of claim 11, wherein the processor RLL-encodes, in the RW channel module, the predetermined area data that is subjected to error correction processing, and stores resultant data in the internal memory.

14. The controller of claim 12, wherein the processor RLL-encodes, in the RW channel module, the predetermined area data that is subjected to error correction processing, and stores resultant data in the internal memory.

15. The method of claim 9, further comprising:

storing data from the buffer memory in the synchronization memory for synthesizing the buffer memory and the RW channel module after an error correction code is added by a first error correction processing module provided between the buffer memory and the RW channel module; and subjecting the stored data to error correction in the second error correction processing module provided between the buffer memory and the RW channel module.

16. The method of claim 9, further comprising:

adding the rewrite data stored in the buffer memory with a first error correction code;

subjecting the rewrite data stored in the buffer memory to error correction in the first error correction processing module provided between the buffer memory and the RW channel module, using the first error correction code for synthesizing the buffer memory and the RW channel module;

adding a second error correction code to the error-corrected data in the second error correction processing module provided between the buffer memory and the RW channel module;

storing the code-added data in the synchronization memory; and subjecting the stored data to error correction using the second error correction code in the third error correction processing module provided between the buffer memory and the RW channel module.

17. The method of claim 15, wherein the storing the resultant data in the internal memory comprises RLL-encoding, in the RW channel module, the predetermined area data that is subjected to error correction processing, and storing resultant data in the internal memory.

18. The method of claim 16, wherein the storing the resultant data in the internal memory comprises RLL-encoding, in the RW channel module, the predetermined area data that is subjected to error correction processing, and storing resultant data in the internal memory.

* * * * *